US012743768B2

(12) United States Patent
Lee

(10) Patent No.: US 12,743,768 B2
(45) Date of Patent: Sep. 22, 2026

(54) ADAPTIVE AND ROBUST DETECTION OF LARGE DEFECTS AND IMAGE MISALIGNMENT

(71) Applicant: KLA Corporation, Milpitas, CA (US)

(72) Inventor: Hucheng Lee, Cupertino, CA (US)

(73) Assignee: KLA Corporation, Milpitas, CA (US)

( * ) Notice: Subject to any disclaimer, the term of this patent is extended or adjusted under 35 U.S.C. 154(b) by 286 days.

(21) Appl. No.: 18/438,384

(22) Filed: Feb. 9, 2024

(65) Prior Publication Data

US 2025/0245815 A1 Jul. 31, 2025

Related U.S. Application Data

(60) Provisional application No. 63/627,793, filed on Jan. 31, 2024.

(51) Int. Cl.

| | |
|---|---|
| ***G06T 5/40*** | (2006.01) |
| ***G06T 5/50*** | (2006.01) |
| ***G06T 7/00*** | (2017.01) |
| ***G06T 7/254*** | (2017.01) |
| ***G06V 10/75*** | (2022.01) |

(52) U.S. Cl.

CPC ................ *G06T 7/001* (2013.01); *G06T 5/40* (2013.01); *G06T 5/50* (2013.01); *G06V 10/758* (2022.01); *G06T 2207/20224* (2013.01)

(58) Field of Classification Search

CPC .. G06T 7/001; G06T 5/40; G06T 5/50; G06T 2207/20224; G06T 7/254; G06T 2207/20021; G06T 2207/30148; G06V 10/758

See application file for complete search history.

(56) References Cited

U.S. PATENT DOCUMENTS

| | | | | |
|---|---|---|---|---|
| 7,831,083 | B1 * | 11/2010 | Lauber | G06T 7/001 382/199 |
| 8,126,255 | B2 | 2/2012 | Bhaskar et al. | |
| 8,664,594 | B1 | 3/2014 | Jiang et al. | |
| 8,692,204 | B2 | 4/2014 | Kojima et al. | |
| 8,698,093 | B1 | 4/2014 | Gubbens et al. | |

(Continued)

OTHER PUBLICATIONS

International Search Report and Written Opinion for PCT/US2025/013282 mailed May 22, 2025.

*Primary Examiner* — John Villecco
*Assistant Examiner* — Kyla Guan-Ping Tiao Allen
(74) *Attorney, Agent, or Firm* — Entropy Matters LLC

(57) ABSTRACT

Methods and systems for detecting defects on a specimen are provided. One method includes generating one or more statistics for each of multiple tiles in difference image frames generated for a job of the images. The method also includes identifying outlier tiles in the multiple tiles based on the statistic(s) generated for each of the multiple tiles. The method further includes determining one or more defect detection parameters of a defect detection method for each of the difference image frames based on the identified outlier tiles and detecting defects on the specimen with the determined defect detection parameter(s). The embodiments described herein are particularly suitable for identifying large defects, grossly defective image frames, and image misalignment in difference image generation that can be missed by currently used inspection methods and systems.

18 Claims, 14 Drawing Sheets

(56) References Cited

U.S. PATENT DOCUMENTS

| | | | | |
|---|---|---|---|---|
| 8,716,662 | B1 | 5/2014 | MacDonald et al. | |
| 9,222,895 | B2 | 12/2015 | Duffy et al. | |
| 2003/0164942 | A1 | 9/2003 | Take | |
| 2013/0188859 | A1 | 7/2013 | Luo et al. | |
| 2014/0002632 | A1 | 1/2014 | Lin | |
| 2017/0178309 | A1* | 6/2017 | Rakhshanfar | H04N 17/00 |
| 2018/0238816 | A1* | 8/2018 | Sousa | G06T 7/001 |
| 2020/0244963 | A1* | 7/2020 | Patwary | G06T 7/001 |
| 2020/0410660 | A1 | 12/2020 | Tandia et al. | |
| 2021/0097666 | A1* | 4/2021 | Brauer | G06T 7/143 |
| 2022/0223481 | A1* | 7/2022 | Zheng | H01L 22/20 |
| 2023/0169641 | A1 | 6/2023 | Lee et al. | |

* cited by examiner

Computer
subsystem
124
126
134
122
130
132
128

300

302

FIG. 7
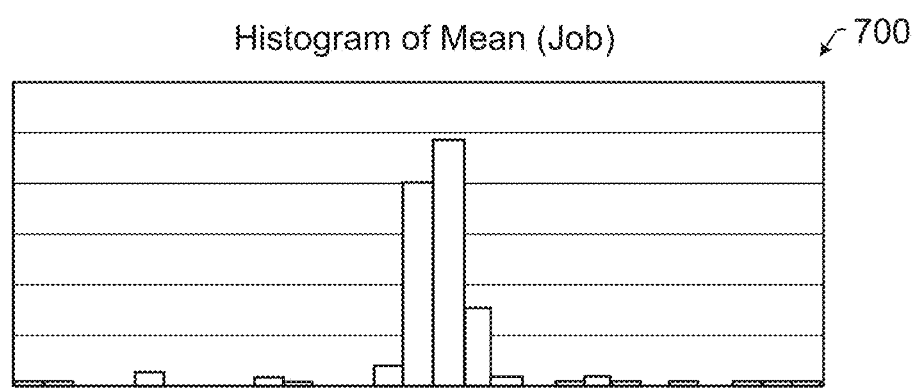
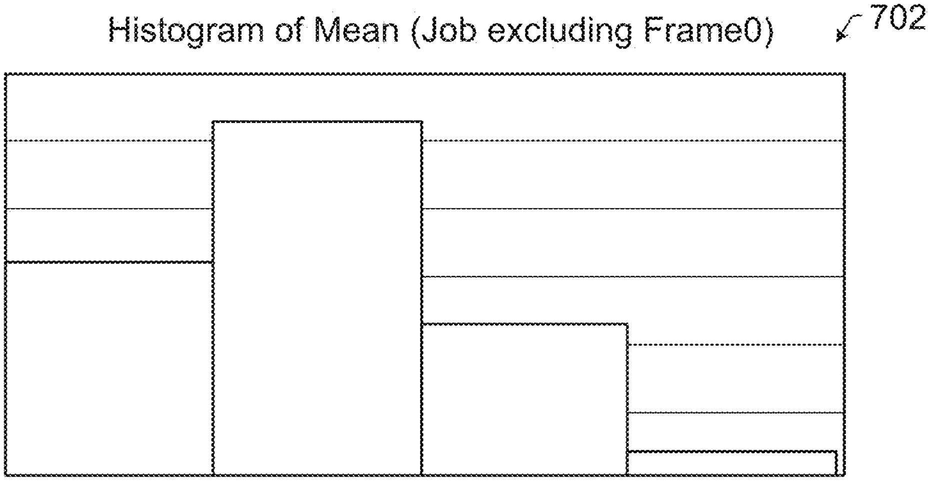
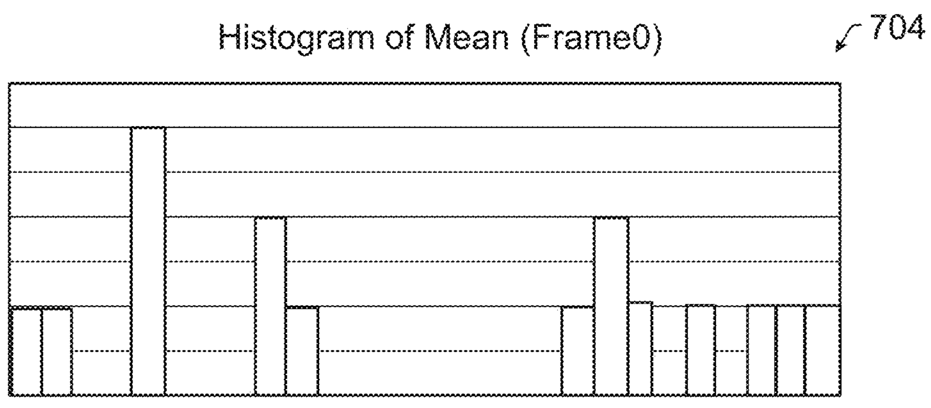

FIG. 8
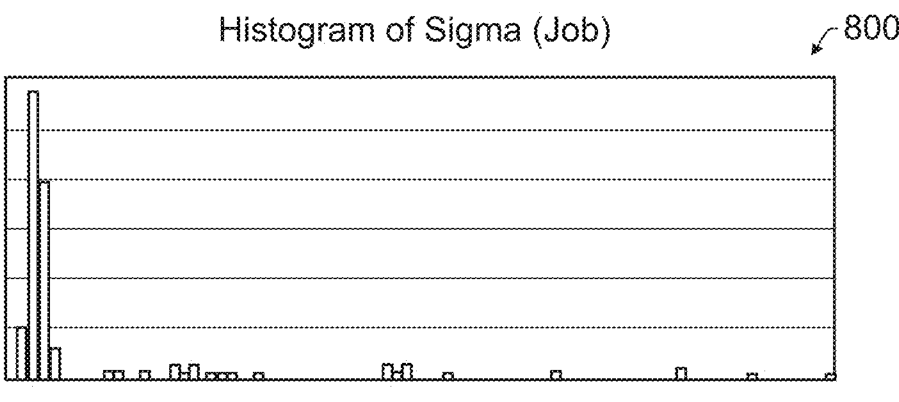
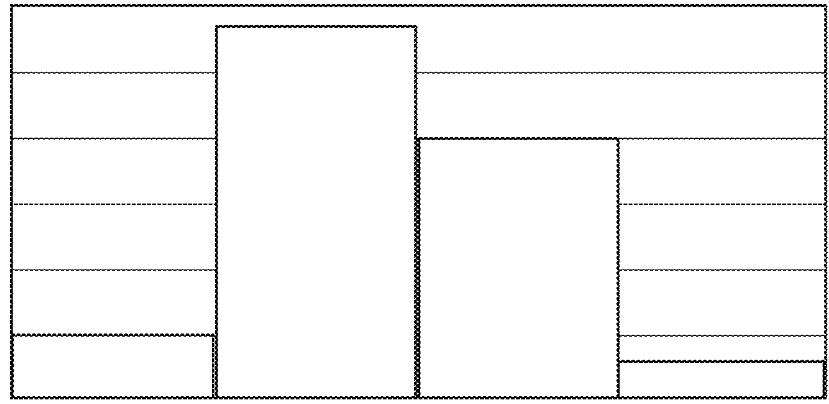
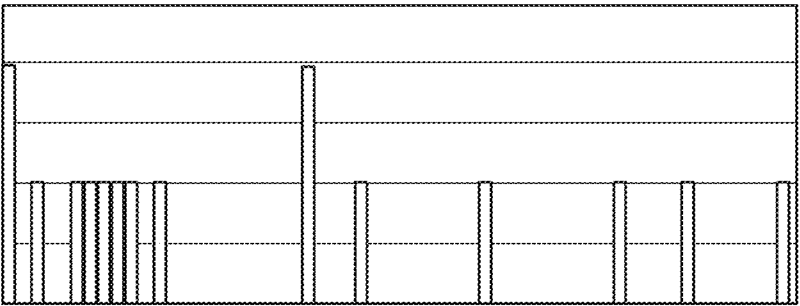

FIG. 9
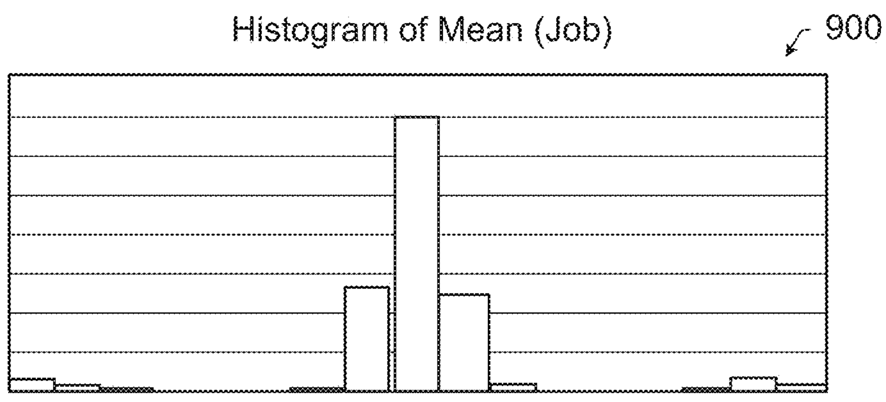
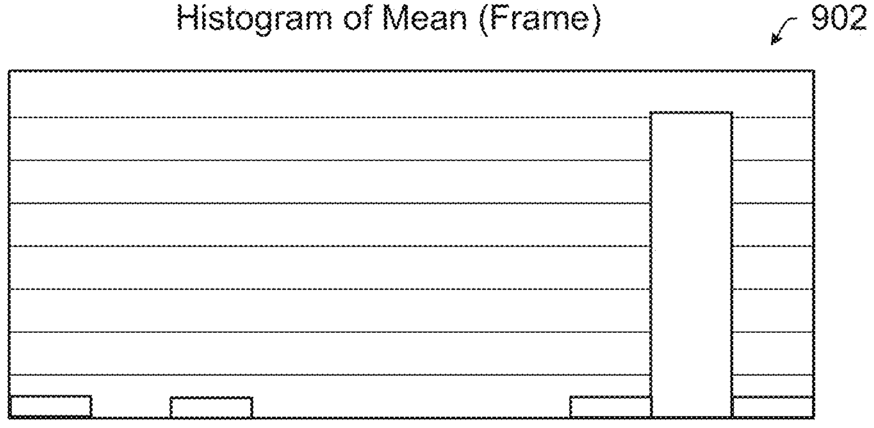

FIG. 10
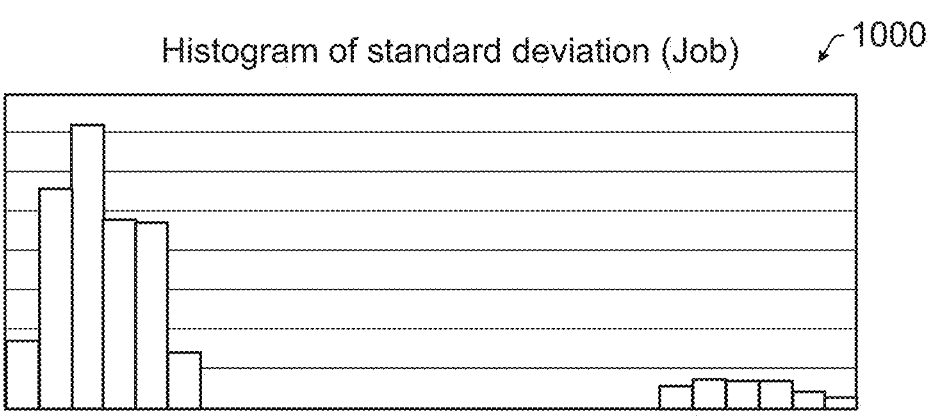
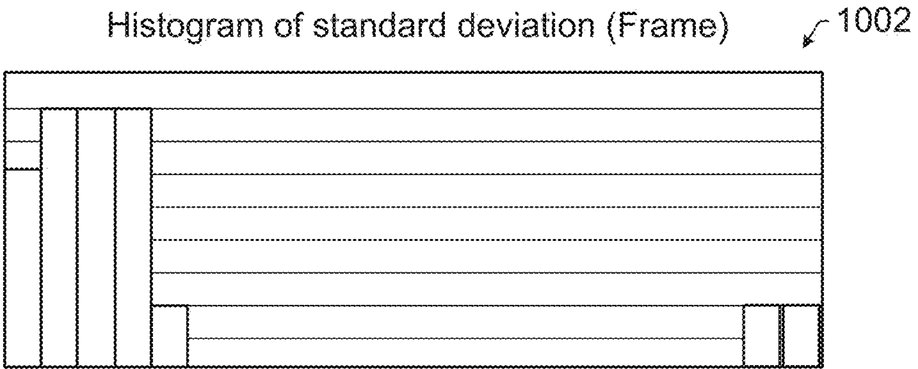

FIG. 11
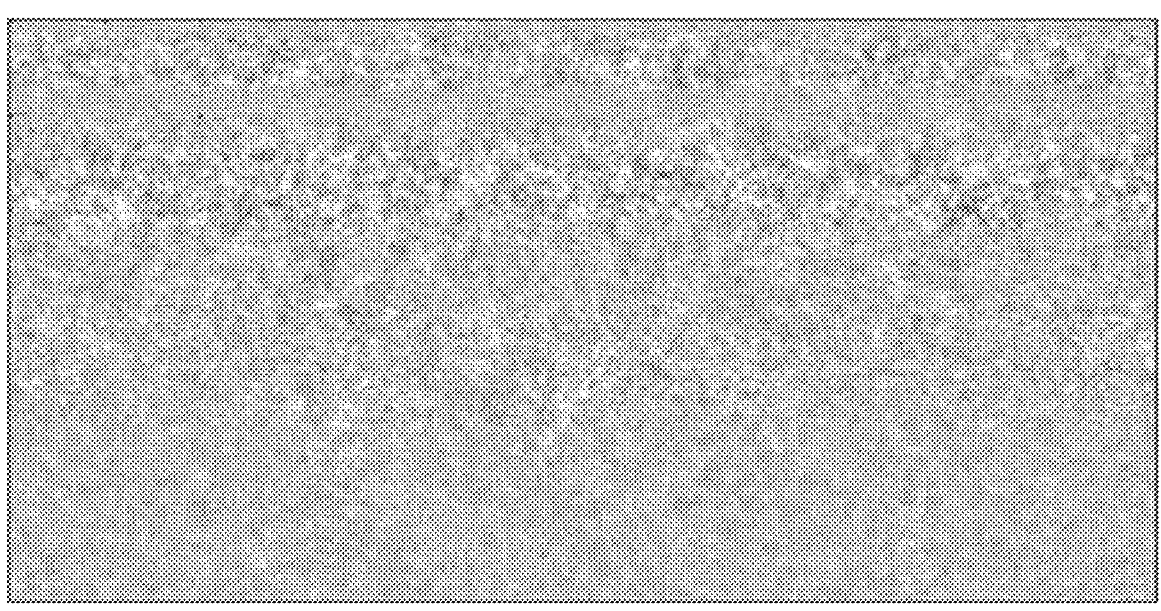
FIG. 12
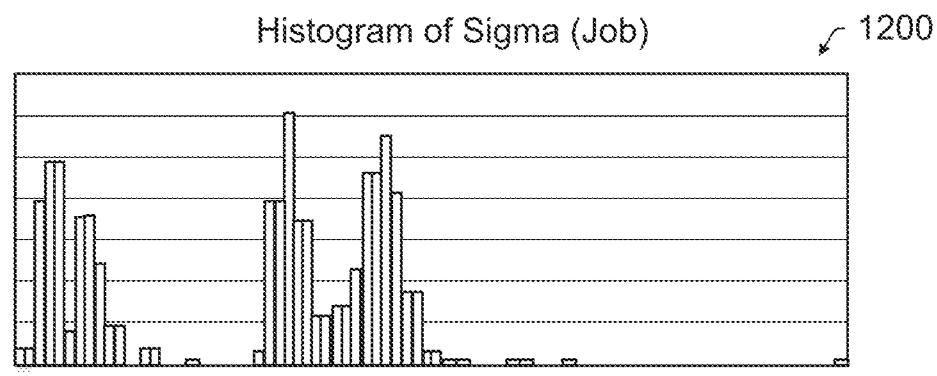
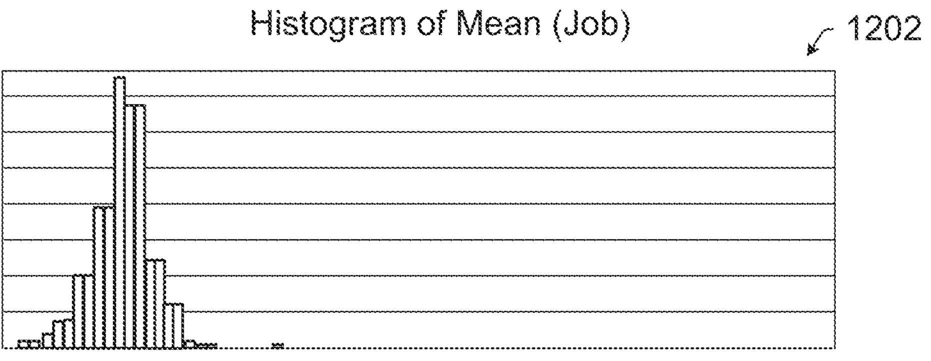

1300

1400

DRAM job with misalignment

FIG. 17
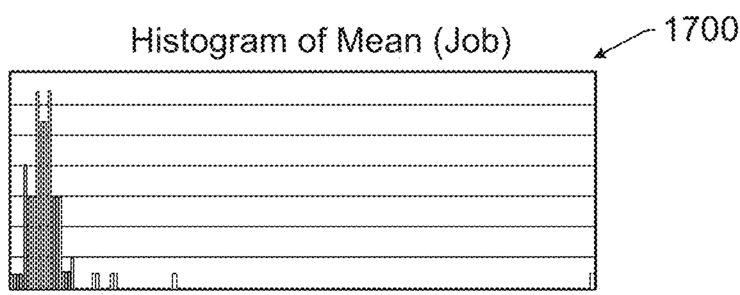
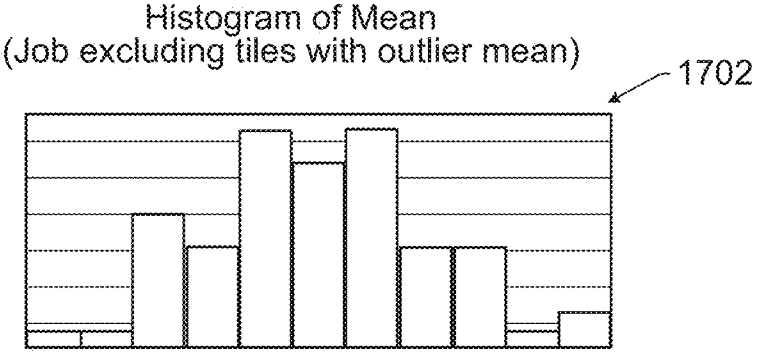
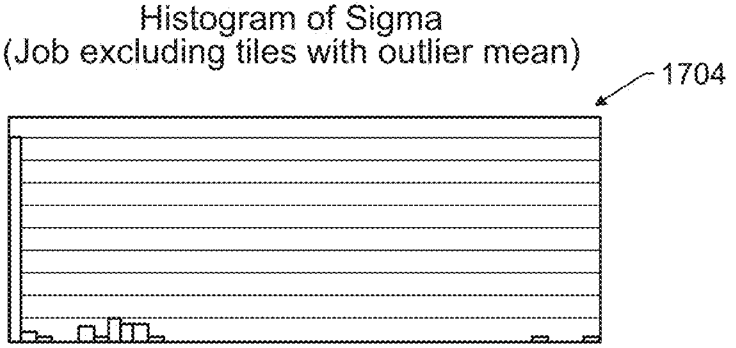
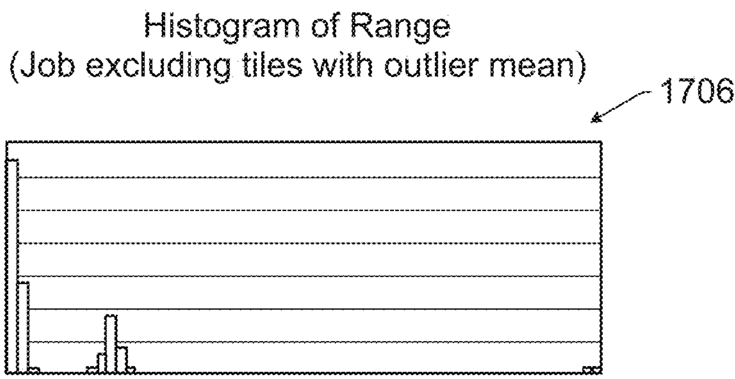

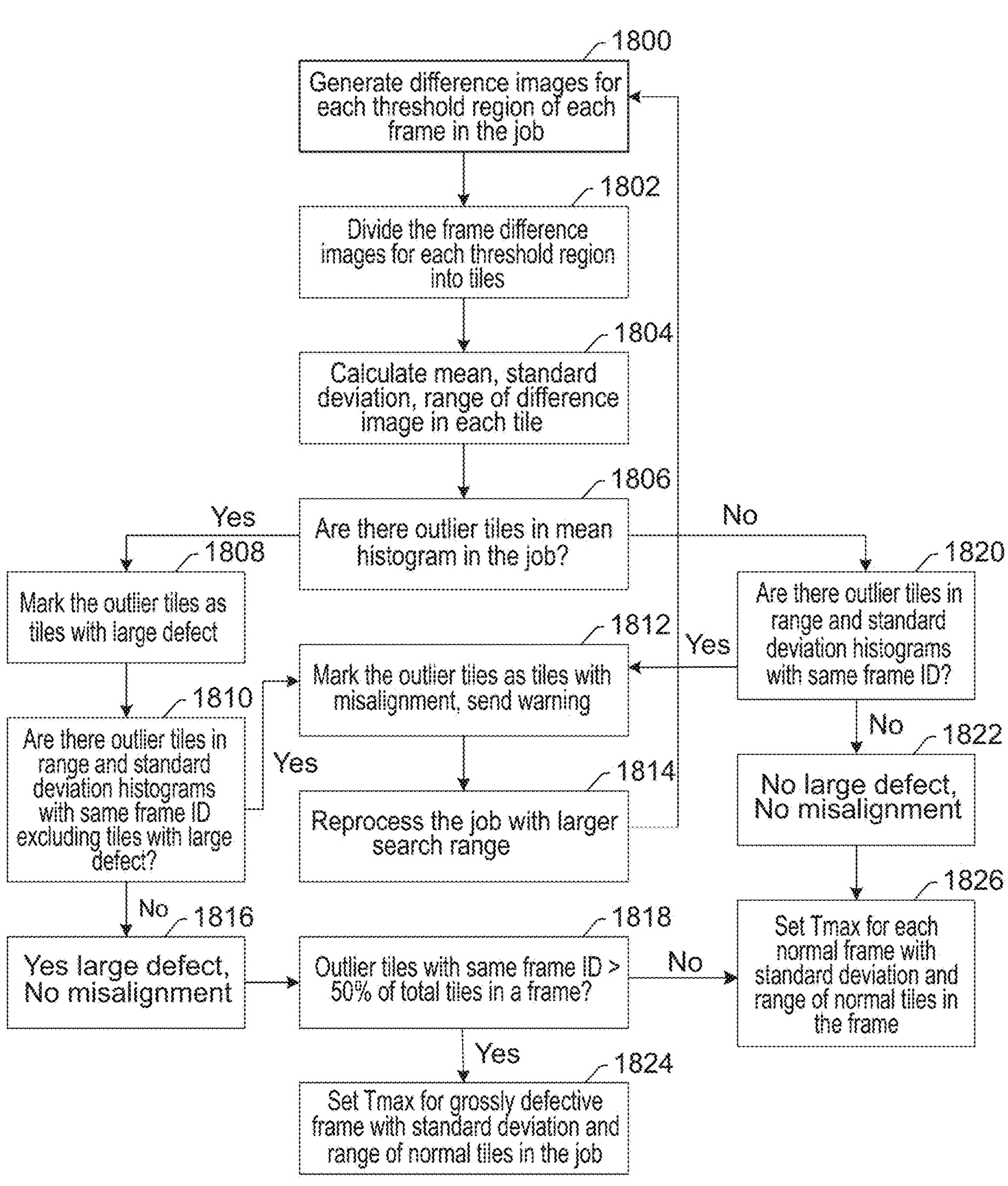
FIG. 18
1800
Generate difference images for each threshold region of each frame in the job
1802
Divide the frame difference images for each threshold region into tiles
1804
Calculate mean, standard deviation, range of difference image in each tile
1806
Are there outlier tiles in mean histogram in the job?
Yes
No
1808
Mark the outlier tiles as tiles with large defect
1810
Are there outlier tiles in range and standard deviation histograms with same frame ID excluding tiles with large defect?
Yes
No
1812
Mark the outlier tiles as tiles with misalignment, send warning
1814
Reprocess the job with larger search range
1816
Yes large defect, No misalignment
1818
Outlier tiles with same frame ID > 50% of total tiles in a frame?
Yes
No
1820
Are there outlier tiles in range and standard deviation histograms with same frame ID?
Yes
No
1822
No large defect, No misalignment
1824
Set Tmax for grossly defective frame with standard deviation and range of normal tiles in the job
1826
Set Tmax for each normal frame with standard deviation and range of normal tiles in the frame

ADAPTIVE AND ROBUST DETECTION OF LARGE DEFECTS AND IMAGE MISALIGNMENT

BACKGROUND OF THE INVENTION

1. Field of the Invention

The present invention generally relates to methods and systems for detecting defects on a specimen in the semiconductor arts. The embodiments described herein are particularly advantageous for adaptive, robust detection of large defects and image misalignment in defect detection.

2. Description of the Related Art

The following description and examples are not admitted to be prior art by virtue of their inclusion in this section.

Fabricating semiconductor devices such as logic and memory devices typically includes processing a specimen such as a semiconductor wafer using a number of semiconductor fabrication processes to form various features and multiple levels of the semiconductor devices. For example, lithography is a semiconductor fabrication process that typically involves transferring a pattern to a resist arranged on a semiconductor wafer. Additional examples of semiconductor fabrication processes include, but are not limited to, chemical-mechanical polishing, etch, deposition, and ion implantation. Multiple semiconductor devices may be fabricated in an arrangement on a semiconductor wafer and then separated into individual semiconductor devices.

Inspection using either optical or electron beam imaging is an important technique for debugging semiconductor manufacturing processes, monitoring process variations, and improving production yield in the semiconductor industry. With the ever decreasing scale of modern integrated circuits (ICs) as well as the increasing complexity of the manufacturing process, inspection becomes more and more difficult.

Inspection tools have various parameters that can be altered based on the specimen that is being inspected. The alterable parameters often include imaging hardware parameters and image processing related parameters. While altering parameters of the tool from specimen-to-specimen can be advantageous, determining the correct parameters for any one specimen can be particularly difficult.

Many approaches have been developed to not only determine which inspection parameters are appropriate for a given specimen, but also which inspection parameters are appropriate for different areas on the same specimen in the same inspection. For example, variation across the specimens described herein may mean that inspection parameters that are most suitable in one specimen area are less than optimal or even completely useless in another specimen area. Some defect detection methods are configured so that parameters like defect detection threshold can be altered dynamically or on-the-fly, which can provide a number of advantages over fixed defect detection thresholds. Such defect detection methods can also have one or more other fixed parameters. Regardless of whether the defect detection parameters are alterable across a specimen or are fixed, the important and difficult challenge is using the correct parameters for inspection.

Some currently used inspection methods use one fixed number as threshold max (Tmax) for each segment in each threshold region running an auto-thresholding defect detection algorithm. When there is a relatively large defect or there are too many of the same kind of relatively small defects in a frame, the defective pixels will form a normal signal cloud preventing those pixels from being detected as outliers with a threshold offset determined based on the signal cloud. A user must then set a Tmax low enough to cut into the normal signal cloud to detect the relatively large defect or large population of relatively small defects in the frame.

Most inspection processes involve some kind of image alignment such as aligning a test image to a reference image to thereby generate a difference image. Accurate image alignment can be therefore important for inspection performance since any image misalignment can be mistakenly detected as defects on the specimen. In some currently used inspection processes, when image misalignment such as frame placement error is beyond the defect detection algorithm alignment search range, the algorithm may give up trying to align the frame images, but no warning may be given to a user.

The currently used inspection methods have therefore a number of important disadvantages. For example, the currently used Tmax is a fixed number across the whole wafer and across production lots. To adjust the Tmax for individual wafers, a user would most likely need to scan a whole wafer to have a good sense of proper Tmax setting. To prevent recipe blowup in production runs (i.e., when the number of detected defects exceeds the capacity of the tool), a user tends to set Tmax higher than needed. As such, a Tmax set by a user is usually not low enough to detect as many defective pixels from large defects as possible, resulting in large defects going undetected. A Tmax set by a user may also or alternatively be not low enough to detect as many defective pixels from a large number of small defects as possible, resulting in inaccurate defect attributes being determined. In other words, a large number of small defects may be mistakenly detected as a relatively large defect and therefore the resulting defect attributes determined for the detected large defect would not accurately represent the small defects. Furthermore, silent misalignment (or misalignment for which no warning is given) results in sensitivity loss to the user. In other words, misalignment that goes undetected may affect defect detection settings in such a way that some defects go undetected.

Accordingly, it would be advantageous to develop systems and methods for inspection of specimens that do not have one or more of the disadvantages described above.

SUMMARY OF THE INVENTION

The following description of various embodiments is not to be construed in any way as limiting the subject matter of the appended claims.

One embodiment relates to a system configured for detecting defects on a specimen. The system includes an inspection subsystem configured for generating images for a specimen. The system also includes a computer subsystem configured for generating one or more statistics for each of multiple tiles in difference image frames generated for a job of the images. The computer subsystem is also configured for identifying outlier tiles in the multiple tiles based on the one or more statistics generated for each of the multiple tiles. In addition, the computer subsystem is configured for determining one or more defect detection parameters of a defect detection method for each of the difference image frames based on the identified outlier tiles. The computer subsystem is further configured for detecting defects on the specimen by applying the defect detection method to the difference image frames with the determined one or more defect detection parameters. The system may be further configured as described herein.

Another embodiment relates to a computer-implemented method for detecting defects on a specimen. The method includes the generating, identifying, determining, and detecting steps performed by the computer subsystem as described above. Each of the steps of the method may be performed as described further herein. The method may include any other step(s) of any other method(s) described herein. The method may be performed by any of the systems described herein.

Another embodiment relates to a non-transitory computer-readable medium storing program instructions executable on a computer system for performing a computer-implemented method for detecting defects on a specimen. The computer-implemented method includes the steps of the method described above. The computer-readable medium may be further configured as described herein. The steps of the computer-implemented method may be performed as described further herein. In addition, the computer-implemented method for which the program instructions are executable may include any other step(s) of any other method(s) described herein.

BRIEF DESCRIPTION OF THE DRAWINGS

Further advantages of the present invention will become apparent to those skilled in the art with the benefit of the following detailed description of the preferred embodiments and upon reference to the accompanying drawings in which:

FIG. 7 is a schematic diagram illustrating example histograms of mean for a job with a grossly defective frame;

FIG. 8 is a schematic diagram illustrating example histograms of standard deviation for a job with a grossly defective frame;

FIG. 9 is a schematic diagram illustrating example histograms of mean for a job without a grossly defective frame but with a large defect;

FIG. 10 is a schematic diagram illustrating example histograms of standard deviation for a job without a grossly defective frame but with a large defect;

FIG. 11 is a schematic diagram illustrating an example of a frame difference image with large noise variation from tile-to-tile;

FIG. 12 is a schematic diagram illustrating example distributions of standard deviation and mean in a job with large noise variation from tile-to-tile;

FIG. 17 is a schematic diagram illustrating examples of a histogram of mean at job level and histograms of mean, standard deviation, and range after excluding tiles with outlier mean;

FIG. 18 is a flow chart illustrating one embodiment of a method for setting an automatic threshold max and handling misalignment.

Figures 1, 2:
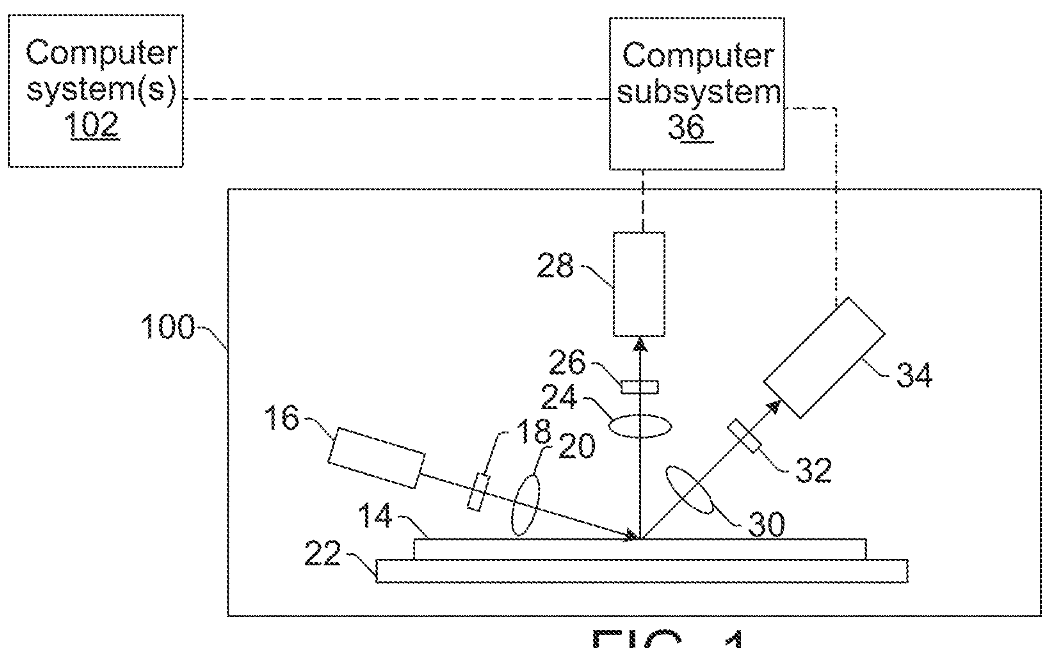
FIGS. 1 and 2 are schematic diagrams illustrating side views of embodiments of a system configured as described herein.

While the invention is susceptible to various modifications and alternative forms, specific embodiments thereof are shown by way of example in the drawings and are herein described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Turning now to the drawings, it is noted that the figures are not drawn to scale. In particular, the scale of some of the elements of the figures is greatly exaggerated to emphasize characteristics of the elements. It is also noted that the figures are not drawn to the same scale. Elements shown in more than one figure that may be similarly configured have been indicated using the same reference numerals. Unless otherwise noted herein, any of the elements described and shown may include any suitable commercially available elements.

In general, the embodiments described herein are configured for detecting defects on a specimen. The embodiments are particularly suitable for adaptive threshold max (Tmax) for robust detection of large defects and warning for misalignment. In this manner, the embodiments described herein can be used to address the deficiency of currently used Tmax for large defect detection and can be used to provide a warning to a user for misalignment that can impact sensitivity.

The embodiments described herein are particularly useful for defect detection that uses a threshold (for separating defects from non-defects) that adapts to noise such as the multi-die adaptive threshold (MDAT) algorithm that is used by some inspection tools commercially available from KLA Corp., Milpitas, Calif. However, the embodiments described herein can provide a number of improvements to any other defect detection method or algorithm that uses an adaptive threshold and/or a Tmax. The embodiments described herein can also provide advantages for any defect detection algorithm that relies on substantially accurate alignment of two or more images to each other.

In some embodiments, the specimen is a wafer. The wafer may include any wafer known in the semiconductor arts. Although some embodiments may be described herein with respect to a wafer or wafers, the embodiments are not limited in the specimens for which they can be used. For example, the embodiments described herein may be used for specimens such as reticles, flat panels, personal computer (PC) boards, and other semiconductor specimens.

One embodiment of a system configured for detecting defects on a specimen is shown in FIG. 1. The system includes inspection subsystem 100. In FIG. 1, the inspection subsystem is configured as a light-based inspection subsystem. However, the inspection subsystem may be configured as an electron beam or charged particle beam based inspection subsystem.

The inspection subsystem is configured for generating images for a specimen. In general, the inspection subsystems described herein include at least an energy source and a detector. The energy source is configured to generate energy that is directed to a specimen. The detector is configured to detect energy from the specimen and to generate output responsive to the detected energy.

In a light-based inspection subsystem, the energy directed to the specimen includes light, and the energy detected from the specimen includes light. For example, as shown in FIG. 1, the inspection subsystem includes an illumination subsystem configured to direct light to specimen 14. The illumination subsystem includes at least one light source, e.g., light source 16. The illumination subsystem is configured to direct the light to the specimen at one or more angles of incidence, which may include one or more oblique angles and/or one or more normal angles. For example, as shown in FIG. 1, light from light source 16 is directed through optical element 18 and then lens 20 to specimen 14 at an oblique angle of incidence. The oblique angle of incidence may include any suitable oblique angle of incidence, which may vary depending on, for instance, characteristics of the specimen and the defects to be detected on the specimen.

The illumination subsystem may be configured to direct the light to the specimen at different angles of incidence. For example, the inspection subsystem may be configured to alter one or more characteristics of one or more elements of the illumination subsystem such that the light can be directed to the specimen at an angle of incidence that is different than that shown in FIG. 1. In one such example, the inspection subsystem may be configured to move light source 16, optical element 18, and lens 20 such that the light is directed to the specimen at a different oblique angle of incidence or a normal (or near normal) angle of incidence. The illumination subsystem may have any other suitable configuration known in the art for directing the light to the specimen at one or more angles of incidence sequentially or simultaneously.

The illumination subsystem may also be configured to direct light with different characteristics to the specimen. For example optical element 18 may be configured as a spectral filter and the properties of the spectral filter can be changed in a variety of different ways (e.g., by swapping out one spectral filter with another) such that different wavelengths of light can be directed to the specimen at different times.

Light source 16 may include a broadband plasma (BBP) light source. In this manner, the light generated by the light source and directed to the specimen may include broadband light. However, the light source may include any other suitable light source such as any suitable laser known in the art configured to generate light at any suitable wavelength(s) known in the art. In addition, the laser may be configured to generate light that is monochromatic or nearly-monochromatic. In this manner, the laser may be a narrowband laser. The light source may also include a polychromatic light source that generates light at multiple discrete wavelengths or wavebands.

Light from optical element 18 may be focused onto specimen 14 by lens 20. Although lens 20 is shown in FIG. 1 as a single refractive optical element, in practice, lens 20 may include a number of refractive and/or reflective optical elements that in combination focus the light from the optical element to the specimen. The illumination subsystem shown in FIG. 1 and described herein may include any other suitable optical elements (not shown). Examples of such optical elements include, but are not limited to, polarizing component(s), spectral filter(s), spatial filter(s), reflective optical element(s), apodizer(s), beam splitter(s), aperture(s), and the like, which may include any such suitable optical elements known in the art. In addition, the system may be configured to alter one or more of the elements of the illumination subsystem based on the type of illumination to be used for inspection.

The inspection subsystem may also include a scanning subsystem configured to change the position on the specimen to which the light is directed and from which the light is detected and possibly to cause the light to be scanned over the specimen. For example, the inspection subsystem may include stage 22 on which specimen 14 is disposed during inspection. The scanning subsystem may include any suitable mechanical and/or robotic assembly (that includes stage 22) that can be configured to move the specimen such that the light can be directed to and detected from different positions on the specimen. In addition, or alternatively, the inspection subsystem may be configured such that one or more optical elements of the inspection subsystem perform some scanning of the light over the specimen such that the light can be directed to and detected from different positions on the specimen. The light may be scanned over the specimen in any suitable fashion such as in a serpentine-like path or in a spiral path.

The inspection subsystem further includes one or more detection channels. At least one of the detection channel(s) includes a detector configured to detect light from the specimen due to illumination of the specimen by the system and to generate output responsive to the detected light. The inspection subsystem shown in FIG. 1 includes two detection channels, one formed by collector 24, element 26, and detector 28 and another formed by collector 30, element 32, and detector 34. The two detection channels are configured to collect and detect light at different angles of collection. In some instances, both detection channels are configured to detect scattered light, and the detection channels are configured to detect light that is scattered at different angles from the specimen. However, one or more of the detection channels may be configured to detect another type of light from the specimen (e.g., reflected light).

In FIG. 1, both detection channels are shown positioned in the plane of the paper and the illumination subsystem is also shown positioned in the plane of the paper. Therefore, in this embodiment, both detection channels are positioned in (e.g., centered in) the plane of incidence. However, one or more of the detection channels may be positioned out of the plane of incidence. For example, the detection channel formed by collector 30, element 32, and detector 34 may be configured to collect and detect light that is scattered out of the plane of incidence. Therefore, such a detection channel may be commonly referred to as a "side" channel, and such a side channel may be centered in a plane that is substantially perpendicular to the plane of incidence.

Although FIG. 1 shows an embodiment of the inspection subsystem that includes two detection channels, the inspection subsystem may include a different number of detection channels (e.g., only one detection channel or two or more detection channels). The detection channel formed by collector 30, element 32, and detector 34 may form one side channel as described above, and the inspection subsystem may include an additional detection channel (not shown) formed as another side channel that is positioned on the opposite side of the plane of incidence. Therefore, the inspection subsystem may include the detection channel that includes collector 24, element 26, and detector 28 and that is centered in the plane of incidence and configured to collect and detect light at scattering angle(s) that are at or close to normal to the specimen surface. This detection channel may therefore be commonly referred to as a "top" channel, and the inspection subsystem may also include two or more side channels configured as described above. As such, the inspection subsystem may include at least three channels (i.e., one top channel and two side channels), and each of the at least three channels is configured to collect light at different scattering angles than each of the other collectors.

As described further above, one or more of the detection channels may be configured to detect scattered light. Therefore, the inspection subsystem shown in FIG. 1 may be configured for dark field (DF) inspection of specimens. However, the inspection subsystem may also or alternatively include detection channel(s) that are configured for bright field (BF) inspection of specimens. Therefore, the inspection subsystems described herein may be configured for only DF, only BF, or both DF and BF inspection. Although each of the collectors are shown in FIG. 1 as single refractive optical elements, each of the collectors may include refractive optical element(s) and/or reflective optical element(s).

The one or more detection channels may include any suitable detectors known in the art such as photo-multiplier tubes (PMTs), charge coupled devices (CCDs), and time delay integration (TDI) cameras. The detectors may also include non-imaging detectors or imaging detectors. If the detectors are non-imaging detectors, each of the detectors may be configured to detect certain characteristics of the scattered light such as intensity but may not be configured to detect such characteristics as a function of position within the imaging plane. As such, the output that is generated by each of the detectors in each of the detection channels may be signals or data, but not image signals or image data. In such instances, a computer subsystem may be configured to generate images of the specimen from the non-imaging output of the detectors. However, in other instances, the detectors may be configured as imaging detectors that are configured to generate imaging signals or image data. Therefore, the inspection subsystem may be configured to generate images in a number of ways.

Computer subsystem 36 may be coupled to the detectors of the inspection subsystem in any suitable manner (e.g., via one or more transmission media, which may include "wired" and/or "wireless" transmission media) such that the computer subsystem can receive the output generated by the detectors. Computer subsystem 36 may be configured to perform a number of functions using the output of the detectors as described further herein. Computer subsystem 36 may be further configured as described herein.

Computer subsystem 36 (as well as other computer subsystems described herein) may also be referred to herein as computer system(s). Each of the computer subsystem(s) or system(s) described herein may take various forms, including a personal computer system, image computer, mainframe computer system, workstation, network appliance, Internet appliance, or other device. In general, the term "computer system" may be broadly defined to encompass any device having one or more processors, which executes instructions from a memory medium. The computer subsystem(s) or system(s) may also include any suitable processor known in the art such as a parallel processor. In addition, the computer subsystem(s) or system(s) may include a computer platform with high speed processing and software, either as a standalone or a networked tool.

If the system includes more than one computer subsystem, then the different computer subsystems may be coupled to each other such that images, data, information, instructions, etc. can be sent between the computer subsystems. For example, computer subsystem 36 may be coupled to computer system(s) 102 as shown by the dashed line in FIG. 1 by any suitable transmission media, which may include any suitable wired and/or wireless transmission media known in the art. Two or more of such computer subsystems may also be effectively coupled by a shared computer-readable storage medium (not shown).

Although the inspection subsystem is described above as being an optical or light-based inspection subsystem, the inspection subsystem may be configured as an electron beam based inspection subsystem. In an electron beam inspection subsystem, the energy directed to the specimen includes electrons, and the energy detected from the specimen includes electrons. In one such embodiment shown in FIG. 2, the inspection subsystem includes electron column 122, and the system includes computer subsystem 124 coupled to the inspection subsystem. Computer subsystem 124 may be configured as described above. In addition, such an inspection subsystem may be coupled to another one or more computer subsystems in the same manner described above and shown in FIG. 1.

As also shown in FIG. 2, the electron column includes electron beam source 126 configured to generate electrons that are focused to specimen 128 by one or more elements 130. The electron beam source may include, for example, a cathode source or emitter tip, and one or more elements 130 may include, for example, a gun lens, an anode, a beam limiting aperture, a gate valve, a beam current selection aperture, an objective lens, and a scanning subsystem, all of which may include any such suitable elements known in the art.

Electrons returned from the specimen (e.g., secondary electrons) may be focused by one or more elements 132 to detector 134. One or more elements 132 may include, for example, a scanning subsystem, which may be the same scanning subsystem included in element(s) 130.

The electron column may include any other suitable elements known in the art. In addition, the electron column may be further configured as described in U.S. Pat. No. 8,664,594 issued Apr. 4, 2014 to Jiang et al., U.S. Pat. No. 8,692,204 issued Apr. 8, 2014 to Kojima et al., U.S. Pat. No. 8,698,093 issued Apr. 15, 2014 to Gubbens et al., and U.S. Pat. No. 8,716,662 issued May 6, 2014 to MacDonald et al., which are incorporated by reference as if fully set forth herein.

Although the electron column is shown in FIG. 2 as being configured such that the electrons are directed to the specimen at an oblique angle of incidence and are scattered from the specimen at another oblique angle, the electron beam may be directed to and scattered from the specimen at any suitable angles. In addition, the electron beam inspection subsystem may be configured to use multiple modes to generate output for the specimen as described further herein (e.g., with different illumination angles, collection angles, etc.). The multiple modes of the electron beam inspection subsystem may be different in any output generation parameters of the inspection subsystem.

Computer subsystem 124 may be coupled to detector 134 as described above. The detector may detect electrons returned from the surface of the specimen thereby forming electron beam images of (or other output for) the specimen. The electron beam images may include any suitable electron beam images. Computer subsystem 124 may be configured to perform any step(s) described herein. A system that includes the inspection subsystem shown in FIG. 2 may be further configured as described herein.

FIGS. 1 and 2 are provided herein to generally illustrate configurations of an inspection subsystem that may be included in the system embodiments described herein. Obviously, the inspection subsystem configuration described herein may be altered to optimize the performance of the inspection subsystem as is normally performed when designing a commercial inspection system. In addition, the systems described herein may be implemented using an existing inspection system (e.g., by adding functionality described herein to an existing inspection system) such as the tools that are commercially available from KLA. For some such systems, the methods described herein may be provided as optional functionality of the inspection system (e.g., in addition to other functionality of the inspection system). Alternatively, the inspection system described herein may be designed "from scratch" to provide a completely new inspection system.

Although the inspection subsystem is described above as being a light or electron beam inspection subsystem, the inspection subsystem may be an ion beam inspection subsystem. Such an inspection subsystem may be configured as shown in FIG. 2 except that the electron beam source may be replaced with any suitable ion beam source known in the art. In addition, the inspection subsystem may include any other suitable ion beam system such as those included in commercially available focused ion beam (FIB) systems, helium ion microscopy (HIM) systems, and secondary ion mass spectroscopy (SIMS) systems.

The inspection subsystem may be configured to generate output, e.g., images, of the specimen with multiple modes. In general, a "mode" is defined by the values of parameters of the inspection subsystem used for generating images of a specimen (or the output used to generate images of the specimen). Therefore, modes may be different in the values for at least one of the parameters of the inspection subsystem (other than position on the specimen at which the output is generated). For example, the modes may be different in any one or more alterable parameters (e.g., illumination polarization(s), angle(s), wavelength(s), etc., detection polarization(s), angle(s), wavelength(s), etc.) of the inspection subsystem. The inspection subsystem may be configured to scan the specimen with the different modes in the same scan or different scans, e.g., depending on the capability of using multiple modes to scan the specimen at the same time.

In a similar manner, the electron beam subsystem may be configured to generate images with two or more modes, which can be defined by the values of parameters of the electron beam subsystem used for generating images for a specimen. Therefore, modes may be different in the values for at least one of the electron beam parameters of the electron beam subsystem. For example, different modes may use different angles of incidence for illumination.

As noted above, the inspection subsystem is configured for scanning energy (e.g., light, electrons, etc.) over a physical version of the specimen thereby generating output for the physical version of the specimen. In this manner, the inspection subsystem may be configured as an "actual" subsystem, rather than a "virtual" subsystem. However, a storage medium (not shown) and computer subsystem(s) 102 shown in FIG. 1 may be configured as a "virtual" system. In particular, the storage medium and the computer subsystem(s) may be configured as a "virtual" inspection system as described in commonly assigned U.S. Pat. No. 8,126,255 issued on Feb. 28, 2012 to Bhaskar et al. and U.S. Pat. No. 9,222,895 issued on Dec. 29, 2015 to Duffy et al., which are incorporated by reference as if fully set forth herein. The embodiments described herein may be further configured as described in these patents.

A "job" as that term is used herein is defined as a number of image frames that are collectively processed by a computer subsystem for detecting defects on a specimen. For example, the entirety of the images that are generated during an inspection process cannot be processed all together (e.g., even if it is possible, it is not time or cost efficient). Therefore, the entirety of the images are separated into jobs of image frames that can be processed collectively for defect detection in a more inexpensive and timely manner.

In general, an "image frame" is defined as a collection of pixels in an image that are processed collectively for a purpose such as defect detection. The size of the image frame may therefore vary depending on certain characteristics of the inspection subsystem or the computer subsystem. In this manner, an image frame includes a predetermined number of pixels, and a job includes a number of the image frames.

Figures 3, 4:
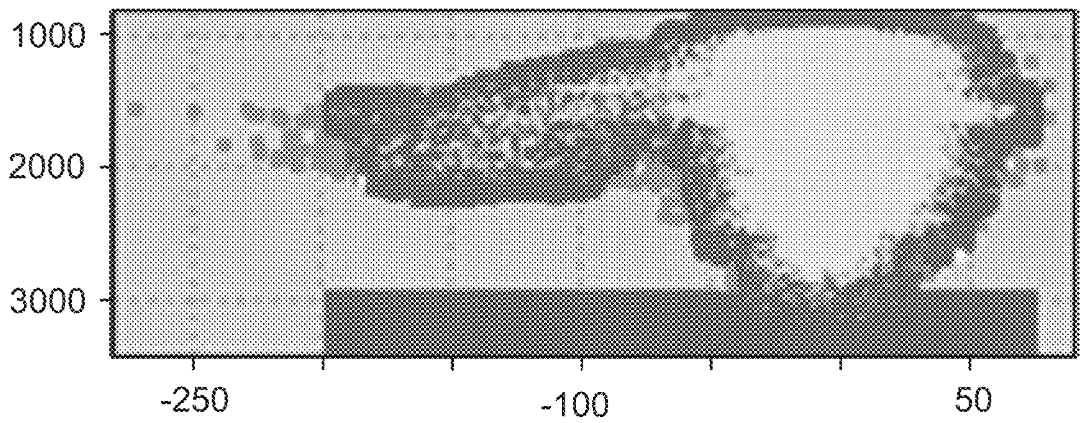
FIG. 3 is a schematic diagram illustrating an example of a frame difference image.
FIG. 4 is a schematic diagram illustrating an example of a distorted multi-die auto-thresholding (MDAT) algorithm cloud due to a large defect in the frame difference image of FIG. 3.

As used herein, the term "large defect" is defined as a defect on a specimen having a size sufficient to affect one or more statistics in a difference image frame generated for the specimen. In other words, rather than presenting as an outlier, a large defect is one that can affect what is perceived as normal or non-defective by a defect detection algorithm thereby evading detection. For instance, a "large" defect is one that can have an impact on MDAT detection. More specifically, when there is a large defect or there are too many of the same type of small defects present in a frame, an MDAT cloud can be distorted by the large number of defective pixels forming their own normal MDAT cloud. As shown in FIG. 3, for example, frame difference image 300 includes large defect 302, which may distort the MDAT cloud as shown in FIG. 4. Therefore, a proper Tmax must be used to detect such defect(s) reliably.

The computer subsystem is configured for generating one or more statistics for each of multiple tiles in difference image frames generated for a job of the images. In this manner, the computer subsystem may calculate statistic data of the frame difference images in each job. The terms "difference image frames" and "frame difference images" are used interchangeably herein to refer to difference images that are frame-sized. The terms "standard deviation," "sigma," and "G" are used interchangeably herein.

The computer subsystem may or may not generate the difference image frames. In one embodiment, the difference image frames include difference image frames generated for only one threshold region in the images. For example, as shown in step 1800 of FIG. 18, the computer subsystem may generate difference images for each threshold region of each frame in a job. A "threshold region" as that term is used herein is defined as a region on a specimen in which the same threshold is used for defect detection. In this manner, a threshold region may be the same as a care area or another area in which the same sensitivity is used for defect detection. The steps described herein may therefore be performed separately for each threshold region on the specimen. The difference images may be generated in any suitable manner known in the art and with any suitable reference image(s) for the specimen. The computer subsystem may also be configured for generating the reference image(s) in any suitable manner known in the art.

Figure 5:
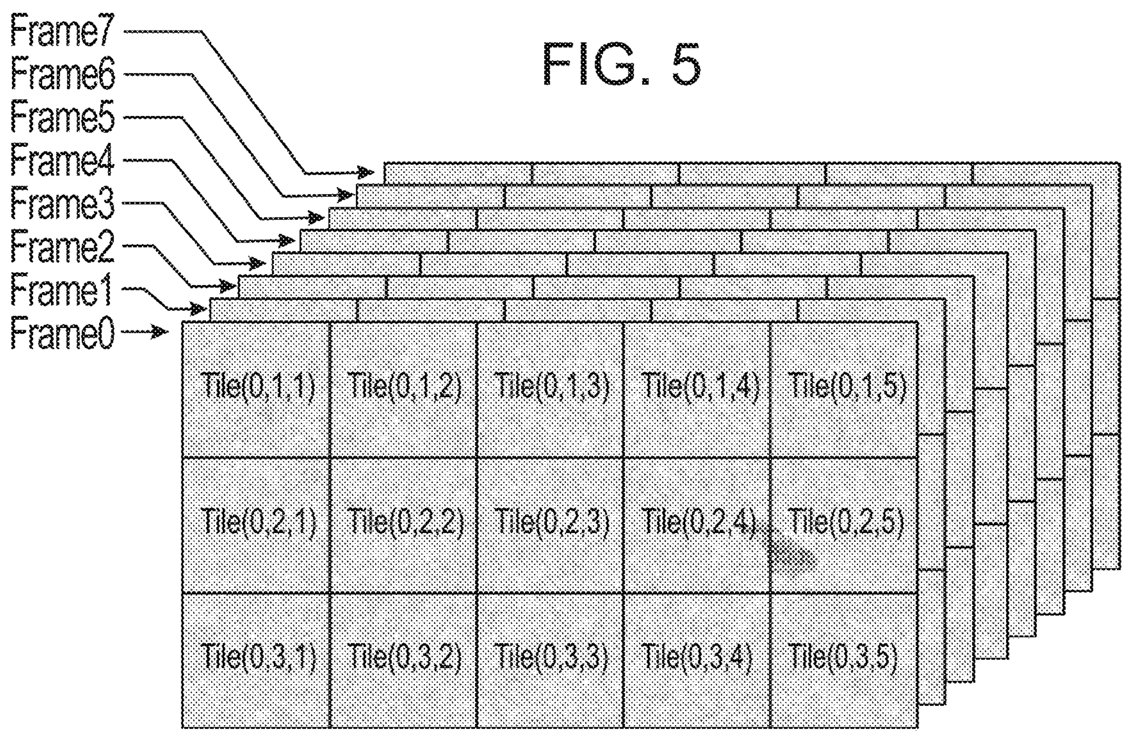
FIG. 5 is a schematic diagram illustrating one embodiment of dividing frame difference images into tiles(i, j, k), where i is the frame index and j and k are the row and column indices, respectively, of the tiles.

In this manner, the computer subsystem may divide a frame into tiles and calculate the statistical data in a job. For example, as shown in step 1802 of FIG. 18, the computer subsystem may divide frame difference images for each threshold region into tiles. As shown in FIG. 5, the computer subsystem may divide the frame difference images, Frame0 . . . Frame7, into tiles(i, j, k), where i is the frame index and j and k are the row and column index of the tiles. Each of those frame difference images may be in the same job and threshold region.

In some embodiments, each of the multiple tiles has a size of between 64 pixels by 64 pixels to 256 pixels by 256 pixels. For example, the computer subsystem may divide the frame difference image into tiles of size such as 256×256 as shown in FIG. 5. A smaller size of the tiles such as 128×128 or 64×64 could also be used. The 256×256 size may be chosen for a minimal throughput hit and enough number of tiles in a frame for statistics. The tile size should not be too small such as 32×32 or 16×16 as the mean and standard deviation (σ) of the tile can be influenced by relatively small defects with relatively strong signal.

The tiles may or may not correspond to a patterned area on a specimen. For example, the tiles may correspond to a patterned area on the specimen like a field or cell. However, that correspondence will depend on the correspondence (or lack thereof) of the difference image frame to any patterned area on the specimen and how the difference image frame is divided into tiles. In particular, as described above, the tile size may be chosen to balance throughput with generating meaningful statistics. So if a difference image frame corresponds to a die on the specimen, then the tiles may correspond to a regular array of areas in the die rather than any particular patterned area within the die. Therefore, a set of tiles whose statistics are collectively examined (e.g., to detect outlier tiles as described further herein) may not correspond to the same patterned features formed on the specimen. In other words, different tiles do not necessarily have a correspondence to different areas on the specimen in which the same design for the specimen is to be formed.

In some embodiments, the one or more statistics include a mean for each of the multiple tiles. The computer subsystem may also calculate statistics such as, but not limited to, the mean, standard deviation (σ), range (min, max) of the difference image in each tile, as shown in step 1804 of FIG. 18. For example, the computer subsystem may calculate a mean of the difference image gray levels for a tile from the gray levels for each pixel in the tile. In this manner, the statistics that are determined by the embodiments described herein may be "within tile" statistics, meaning that statistics may be independently determined for each of the tiles using only the pixels within that tile. The computer subsystem may calculate these and any other statistics in any suitable manner known in the art.

The computer subsystem is also configured for identifying outlier tiles in the multiple tiles based on the one or more statistics generated for each of the multiple tiles. In this manner, the computer subsystem may be configured for using statistical data to identify outlier tiles in a frame. The outlier tiles may be detected as described further herein. In addition, what qualifies a tile as being an outlier may be determined dynamically by the computer subsystem based on the statistics determined for each of the tiles, may be determined based on input from a user, or in any other suitable manner known in the art.

In some embodiments, the one or more statistics include a mean for each of the multiple tiles, and identifying the outlier tiles includes generating a histogram of the mean for each of the multiple tiles and identifying the outlier tiles based on the histogram. For example, as shown in step 1806 of FIG. 18, the computer subsystem may determine if there are outlier tiles in a mean histogram in the job. When there are outlier tiles in the mean histogram in the job, the computer subsystem marks the outlier tiles as tiles with a large defect, as shown in step 1808.

Figure 6:
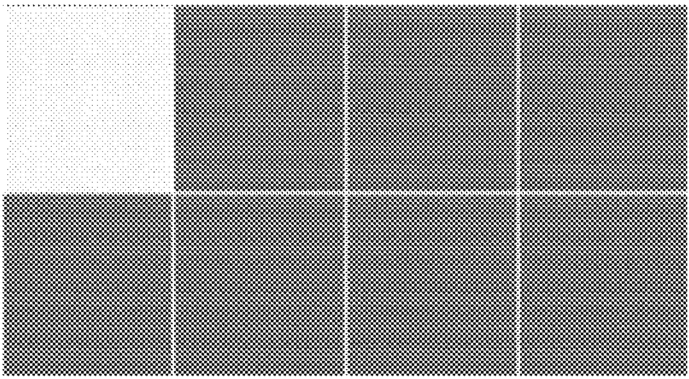
FIG. 6 is a schematic diagram illustrating an example of a test image of a job in which one whole frame is defective.

The computer subsystem may be configured for identifying grossly defective frames among the difference image frames. In particular, the embodiments described herein can use statistical data to identify if there are grossly defective frames in a job. In one embodiment, the computer subsystem is configured for designating a first of the difference image frames as a grossly defective image frame when a number of the outlier tiles in the first of the difference image frames is above a predetermined number. For example, sometimes a large defect is big enough to cover more than half of a frame or even a whole frame as shown in FIG. 6. In the example test image of FIG. 6, the whole top, leftmost frame is defective in the job. The computer subsystem can use the statistical data calculated above to identify if any frame is grossly defective. For example, as shown in FIG. 7, the mean values of the tiles from the grossly defective frame are far away from the normal distribution of mean values of the tiles from the normal frames centered around 0. FIG. 7 shows example histograms of mean with a grossly defective frame in the job. Histogram 700 is a histogram of mean generated for a job, histogram 702 is a histogram of mean generated for the job excluding Frame0 (the grossly defective frame), and histogram 704 is a histogram of mean for Frame0. Each of the histograms described herein may be generated in any suitable manner known in the art. If the number of outlier tiles with the same frame index i is more than half of the total number of tiles in a frame, the computer subsystem may mark that frame as grossly defective.

In one embodiment, the one or more statistics include a standard deviation for each of the multiple tiles, and identifying the outlier tiles includes generating a histogram of the standard deviation for each of the multiple tiles and identifying the outlier tiles based on the histogram. These steps may be performed as described further above with respect to mean histograms. In one such embodiment, the computer subsystem is configured for designating a first of the difference image frames as a grossly defective image frame when a number of the outlier tiles in the first of the difference image frames is above a predetermined threshold. For example, the histograms of σ can also be used to identify grossly defective frames as shown in FIG. 8. FIG. 8 includes example histograms of standard deviation with a grossly defective frame in the job. Histogram 800 is a histogram of sigma generated for a job, histogram 702 is a histogram of sigma generated for the job excluding Frame0 (the grossly defective frame), and histogram 704 is a histogram of sigma for Frame0.

The computer subsystem may also be configured for identifying tiles with a large defect in normal frames (not grossly defective frames). The term "normal frame" means that the number of outlier tiles with the same frame index i is less than half of the total number of tiles in a frame. Under this condition, the distribution of mean of the tiles should form a main cluster centered around 0 as shown in FIG. 9 at frame level and job level for the difference image shown in FIG. 3. FIG. 9 shows example histograms of mean of a job without a grossly defective frame but with a frame containing a large defect. Histogram 900 is a histogram of mean for the job, and histogram 902 is a histogram of mean for the frame with a large defect. The outlier tiles containing the large defect have mean values far away from the main cluster.

The distribution of σ of the tiles can also be used to flag the outlier tiles in this case with the tiles with a large defect well separated from the normal tiles. FIG. 10 shows example histograms of σ of a job without grossly defective frames but with a large defect. Histogram 1000 is a histogram of standard deviation for the job, and histogram 1002 is a histogram of standard deviation of the frame containing the large defect.

Figure 13:
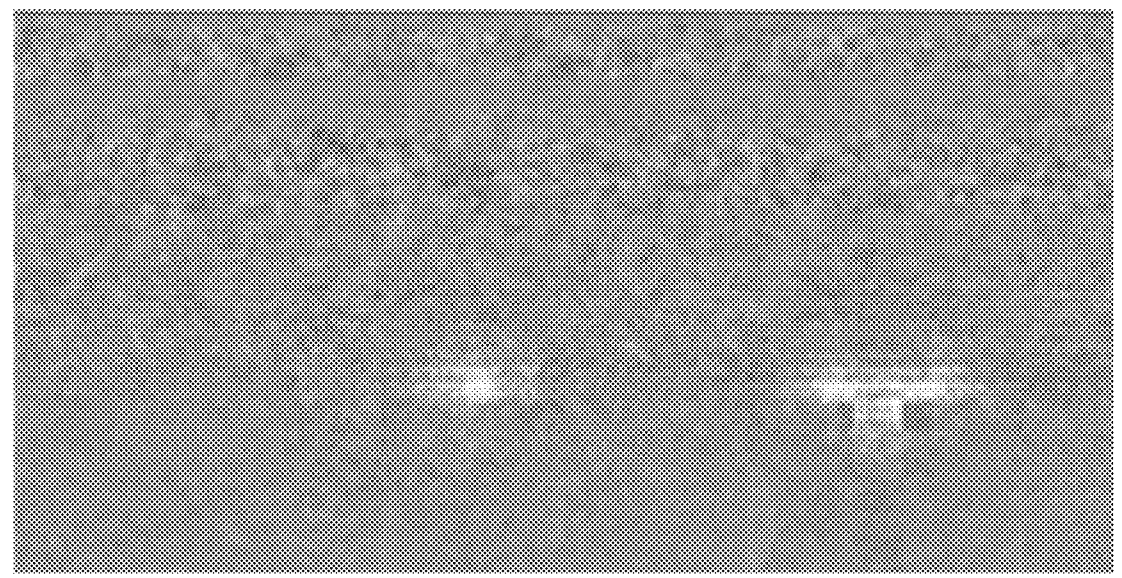
FIG. 13 is a schematic diagram illustrating an example of a frame difference image with large defects flagged by the mean of outlier tiles.

FIG. 11 shows an example of a frame difference image having relatively large noise variation from tile-to-tile. When there are tiles with substantially different noise levels in the same frame as shown in frame image 1100 of FIG. 11, distribution of σ cannot be used to correctly identify the outlier tiles with large defect, but the distribution of mean can still work properly. As shown in FIGS. 12 and 13, distribution of σ suggests the presence of a large number of outlier tiles, but distribution of mean suggests the presence of only several outlier tiles corresponding to a large defect in certain frames. For example, FIG. 12 shows an example of distribution of σ and mean in a job with relatively large noise variation from tile to tile. Histogram 1200 is a histogram of sigma in the job, and histogram 1202 is the histogram of mean in the job. FIG. 13 shows example 1300 of a frame difference image with large defects flagged by the mean of outlier tiles.

Figure 14:
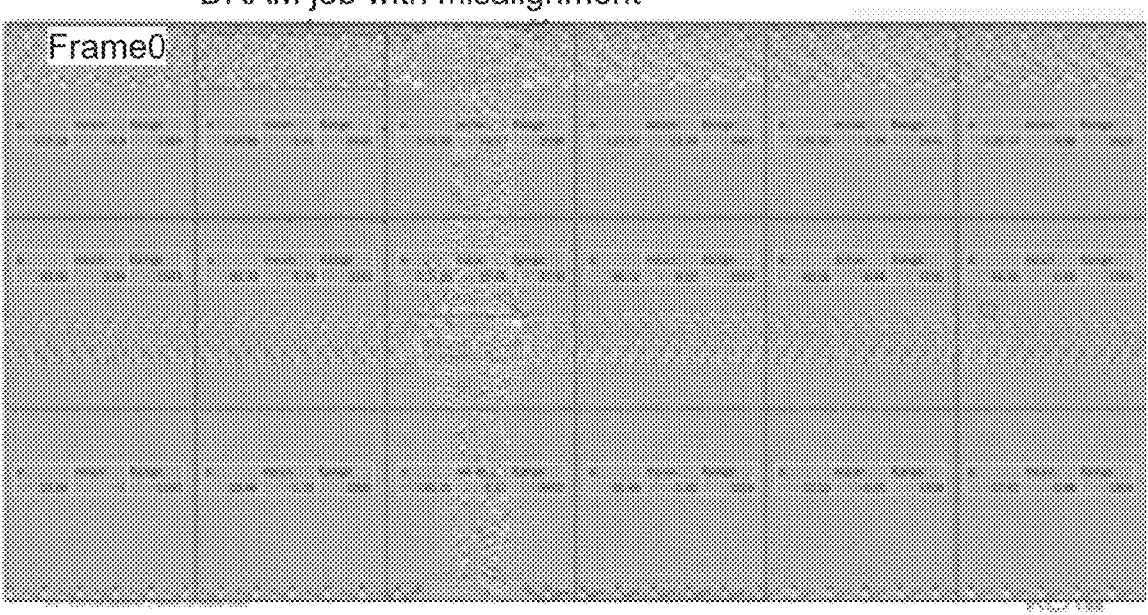
FIG. 14 is a schematic diagram illustrating an example of a difference image frame of a dynamic random access memory (DRAM) wafer when frames are misaligned.
Figure 15:
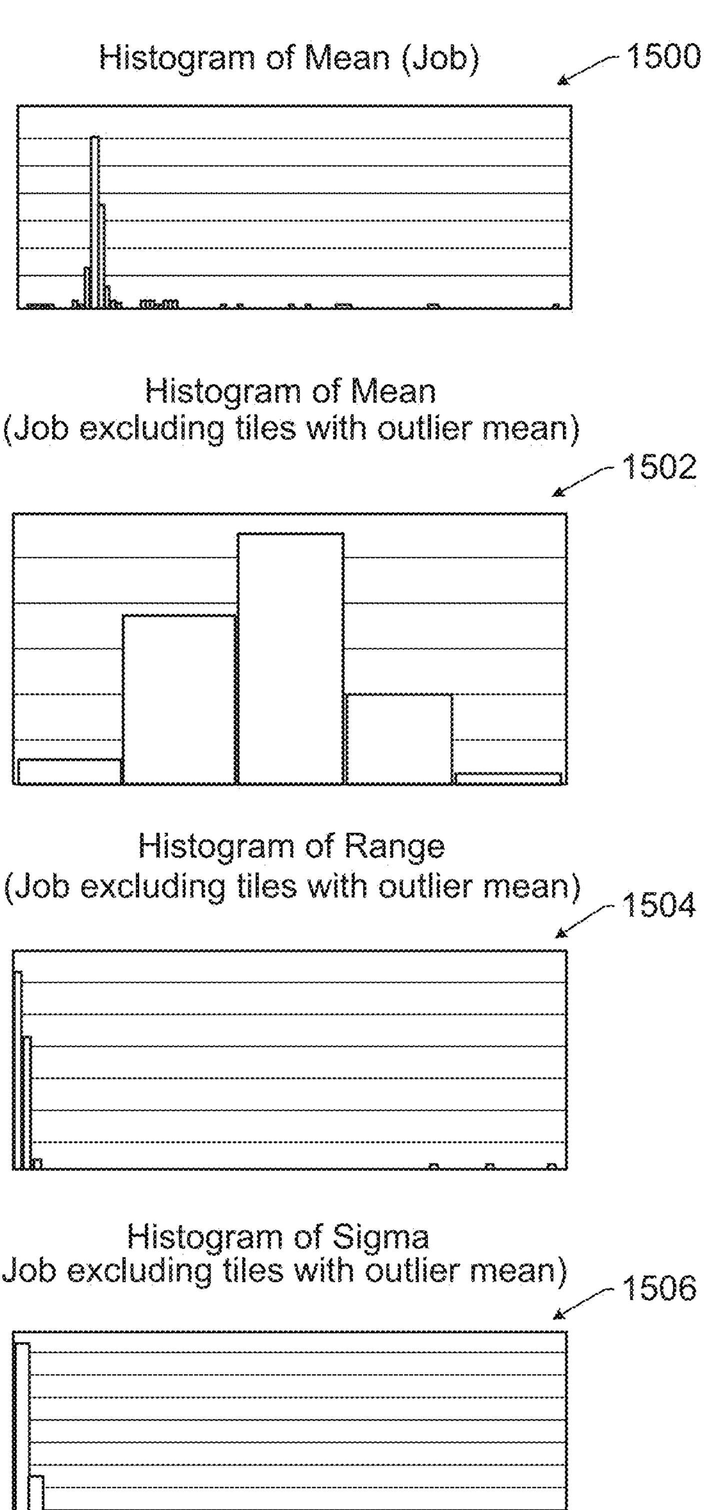
FIG. 15 is a schematic diagram illustrating examples of a histogram of mean at job level and histograms of mean, standard deviation, and range after excluding tiles with outlier mean.

The computer subsystem may also be configured for identifying frame misalignment. FIG. 14 shows example 1400 of a difference image of a DRAM wafer generated when frames that were used to generated the difference image are misaligned to each other. Some tiles of the difference image have mean values deviating far away from the main cluster around 0, as shown in histogram 1500 of mean at job level in FIG. 15. Histogram 1502 is a histogram of the mean for the job excluding tiles with outlier mean values. After removing those tiles with outlier mean, there are still outlier tiles in histogram 1504 of range and histogram 1506 of sigma, which can be explained by the presence of image misalignment. When images are misaligned with each other, the difference image will display bipolar pattern noise with mean around 0 but large difference values of opposite signs.

Figure 16:
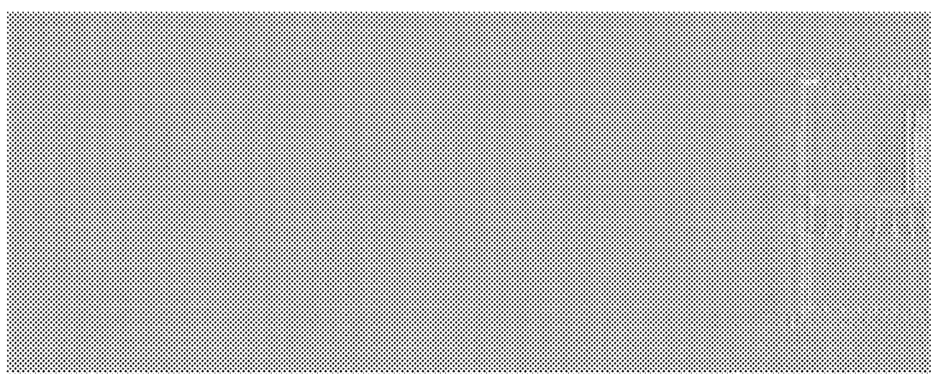
FIG. 16 is a schematic diagram illustrating an example of a difference image generated for a logic wafer when frames are misaligned.

The same is true when misalignment happens on a logic wafer, as shown in FIG. 16, which is an example of a difference image of a logic wafer when frames are misaligned. Misalignment can be flagged by the outlier tiles of sigma and range after excluding tiles with outlier mean, as shown in FIG. 17. Histogram 1700 in FIG. 17 is a histogram of mean at the job level. Histogram 1702 is a histogram of mean after excluding tiles with outlier mean. Histogram 1704 is a histogram of sigma after excluding tiles with outlier mean, and histogram 1706 is a histogram of range after excluding tiles with outlier mean.

In an additional embodiment, the computer subsystem is configured for designating the multiple tiles not identified as the outlier tiles based on the histogram as remaining tiles, the one or more statistics include range and standard deviation for each of the remaining tiles in a first of the difference image frames, and identifying the outlier tiles includes generating range and standard deviation histograms for the remaining tiles in the first of the difference image frames and identifying outlier remaining tiles in the first of the difference image frames based on the range and standard deviation histograms as additional outlier tiles. For example, as shown in step 1810 of FIG. 18, the computer subsystem may determine if there are outlier tiles in range and standard deviation histograms with the same frame ID excluding tiles with large defect. This step may also be performed when there are no outlier tiles detected in a job based on the mean histogram. In this case, the "remaining" tiles would be all of the tiles in the job. For example, as shown in step 1820, the computer subsystem may determine if there are any outlier tiles in range and standard deviation histograms with the same frame ID.

In one such embodiment, when one or more of the remaining tiles are identified as the additional outlier tiles (in step 1810 or 1820), the computer subsystem is configured for designating the outlier tiles and the additional outlier tiles in the first of the difference image frames as misaligned tiles and generating new difference image frames for the job by aligning test and reference image frames for the job with a second search range larger than a first search range used for aligning the test and reference images for generating the difference image frames. For example, as shown in step 1812, when the computer subsystem determines (either in step 1810 or step 1820) that there are outlier tiles in range and standard deviation histograms with the same frame ID excluding tiles with large defect, the computer subsystem marks the outlier tiles as tiles with misalignment. In addition, as shown in step 1814, the computer subsystem may reprocess the job with larger search range. More specifically, the computer subsystem may generate a larger search range than previously used for alignment, reperform image alignment with the larger search range for the test image and reference image(s) used to generate the difference images and repeat step 1800 to generate new difference images for each threshold region of each frame in the job. The computer subsystem may also repeat additional steps performed prior to step 1814 for the new difference images. In this manner, the computer subsystem can re-perform the image alignment for misaligned frames with a larger search range to thereby fix the silent alignment failure and recover the sensitivity lost due to misalignment.

The search range may be increased by a relatively small amount when an image misalignment is detected. For example, the functions performed in steps 1800 to 1814 may be performed relatively quickly and so they may be iteratively performed with relatively small increases in the image alignment search range until no image misalignment has been detected. In this manner, the search range used for image alignment may be automatically determined with incrementally increasing values until successful image alignment has been achieved. The embodiments described herein can therefore advantageously detect image misalignment and ensure proper image alignment for an entire specimen without needing to use a search range that is unnecessarily large for some or most of the specimen. For example, as an alternative to the embodiments described herein, one may attempt to avoid any possible image misalignment by artificially increasing the alignment search range so that it is big enough to ensure proper image alignment, but this approach will have a huge computation cost issue.

In another such embodiment, when one or more of the remaining tiles are identified as the additional outlier tiles, the computer subsystem is configured for generating an output to a user indicating that an image misalignment has occurred in generating the difference image frames. For example, as shown in step 1812, when the computer subsystem determines (either in step 1810 or step 1820) that there are outlier tiles in range and standard deviation histograms with the same frame ID excluding tiles with large defect, the computer subsystem may send a misalignment warning. In this manner, the computer subsystem may be configured to use statistical data to flag wafer image misalignment and give a user a warning about the alignment failure. Therefore, one particularly important advantage of the embodiments described herein is that they address silent (or undetected) wafer image misalignment by giving the user a warning so that they can fix the misalignment issue at recipe level or system level.

Silent wafer image alignment failure results in high noise and lost sensitivity. Providing misalignment warnings to a user as described herein will improve tool sensitivity with misalignment fixed. A warning about the presence of misalignment may be provided to the user in addition to actually fixing the misalignment as described above by regenerating the difference images with a larger search range used for image alignment. Therefore, the embodiments described herein may be configured for both misalignment warning and handling.

In a further embodiment, when none of the remaining outlier tiles are identified as the additional outlier (misaligned) tiles, the computer subsystem is configured for designating the outlier tiles identified based on the histogram of the mean as large defect tiles. For example, when the computer subsystem determines in step 1810 that there are no outlier tiles in range and standard deviation histograms with the same frame ID excluding tiles with a large defect, the computer subsystem may determine in step 1816 that the frame ID has a large defect and no image misalignment. In a similar manner, when the computer subsystem determines in step 1806 that there are no outlier tiles in the mean histogram for the job and determines in step 1820 that there are no outlier tiles in range and standard deviation histograms with the same frame ID, the computer subsystem may determine in step 1822 that the frame contains no large defect and no image misalignment.

In another embodiment, the computer subsystem is configured for designating the first of the difference image frames as a grossly defective image frame when a number of the large defect tiles in the first of the difference image frames is above a predetermined threshold. For example, as shown in step 1818 of FIG. 18, the computer subsystem may determine if the percentage of outlier tiles with the same frame ID is greater than 50% of the total tiles in a frame. When the percentage of outlier tiles with the same frame ID is greater than 50% of the total tiles in the frame, the computer subsystem may designate that frame as a grossly defective frame image. Otherwise, the computer subsystem may designate the frame as a normal frame.

The computer subsystem is further configured for determining one or more defect detection parameters of a defect detection method for each of the difference image frames based on the identified outlier tiles. In this manner, the computer subsystem may be configured to automatically determine one or more defect detection parameters such as Tmax based on the identified outlier tiles. Therefore, one particularly important advantage of the embodiments described herein is that the Tmax set by the embodiments adapts to the noise variation across the wafer and production lots. Another important advantage provided by the embodiments described herein is that the user does not need to scan a wafer to find the proper Tmax.

In some embodiments, determining the one or more defect detection parameters includes determining a threshold max based on the one or more statistics to thereby detect defects on the specimen having a characteristic sufficient to affect the one or more statistics in any one of the difference image frames. In other words, the computer subsystem may determine the Tmax based on the statistical data to thereby detect large defects on the specimen. For example, the computer subsystem may use statistical data to set a substantially aggressive Tmax (a substantially low Tmax) automatically for each frame so that as many defective pixels from a large defect are detected as possible for robust detection and accurate attribute calculation. The large defects that are detected by the embodiments described herein may be any sort of large defects such as those printed on the wafer due to a mask defect, which is advantageous because missing even one large defect could cause huge losses.

In one embodiment, when one of the difference image frames is determined to be a grossly defective image frame based on the one or more statistics, determining the defect detection parameter(s) for the one difference image frame includes determining a threshold max based on at least one of the statistic(s) generated for non-outlier tiles in the job. For example, when the computer subsystem determines in step 1818 that a frame is a grossly defective frame image, the computer subsystem may set Tmax for the grossly defective frame with standard deviation and range of normal tiles in the job, as shown in step 1824 of FIG. 18. In other words, when the computer subsystem determines that a difference image frame is grossly defective, that difference image frame will most likely not include enough normal image tiles to accurately determine a Tmax from only the tiles in that same frame. In this case, then, the Tmax may be determined for the grossly defective difference image frame from any other normal tiles in the whole job. Those normal tiles may include normal tiles in the grossly defective difference image frame if there are any. The normal tiles may also include normal tiles, i.e., any tiles determined to be non-outliers, in other difference image frames in the same job. Therefore, the input to the defect detection parameter(s) determining step may be determined based on whether or not the difference image frame is grossly defective or not. If it is grossly defective, then normal image tiles in the whole job are used; if it is not grossly defective, then normal image tiles in the difference image frame are only used as described further herein.

In one such embodiment, the at least one of the statistic(s) includes peak noise of all of the non-outlier tiles in the job and standard deviation of a noisiest of the non-outlier tiles in the job. In this manner, for a job with a grossly defective frame, the Tmax for that frame equals the peak noise of all tiles excluding outlier tiles in the job plus 1$\sigma$ of the noisiest normal tile.

In another embodiment, when one of the difference image frames is not determined to be a grossly defective image frame based on the statistic(s), determining the one or more defect detection parameters for the one difference image frame includes determining a threshold max based on at least one of the statistic(s) generated for non-outlier tiles in the one difference image frame. For example, when the computer subsystem determines in step 1818 that a frame is not grossly defective, the computer subsystem may set Tmax for the normal frame with standard deviation and range of normal tiles in the frame, as shown in step 1826 of FIG. 18. In this manner, as described above, when a difference image frame is not grossly defective, it will most likely include enough normal or non-outlier tiles from which defect detection parameter(s) can be accurately determined. Therefore, when possible (i.e., when a difference image frame is not grossly defective), the statistics for only normal tiles in a difference image frame are used to determine defect detection parameter(s) for that same difference image frame. Those statistics may be better suited for determining defect detection parameter(s) for the difference image frame than using the statistics from the whole job of non-outlier tiles. For example, if defect detection parameter(s) can be determined for a difference image frame from non-outlier tiles in only that difference image frame, it would be advantageous to do that rather than use the non-outlier tiles in the whole job since the whole job may have some difference image-to-difference image variations that can skew the defect detection parameter(s) determined for any one difference image. In other words, the defect detection parameter(s) may be determined in a localized manner as often as possible (i.e., except for the cases in which a difference image frame is grossly defective).

To demonstrate this as clearly as possible, when first and second difference image frames in a job are both not grossly defective, then the defect detection parameter(s) for the first difference image frame are determined from the statistics for only the non-outlier tiles in only the first difference image frame, and the defect detection parameter(s) for the second difference image frame are determined from the statistics for only the non-outlier tiles in only the second difference image frame. If a third difference image frame in the same job is grossly defective, then the defect detection parameter(s) for the third difference image frame may be determined from the statistics for only the non-outlier tiles in all of the difference image frames in the job. Therefore, the defect detection parameters are determined in as localized a manner as possible except when a grossly defective image frame makes that impractical.

In some such embodiments, the at least one of the statistic(s) includes peak noise of all of the non-outlier tiles in the one difference image frame and standard deviation of a noisiest of the non-outlier tiles in the one difference image frame. In this manner, for a job without grossly defective frames, the Tmax for a frame equals the peak noise (the absolute maximum values of (min,max)) of all tiles excluding outlier tiles in the frame plus 1σ of the noisiest normal tile. Therefore, the defect detection parameters may be determined for grossly defective frames and non-grossly defective frames in the same manner and based on the same statistics, but with different inputs to the defect detection parameter determinations as described above.

The defect detection parameter(s) that are determined by any application of the embodiments described herein may vary depending on the inspection process and what issues are of concern to a user. For example, a user may select whether the defect detection parameter(s) that are determined by the embodiments described herein include only an indication of misalignment (e.g., a warning when misalignment is detected), misalignment correction, auto-Tmax determination, or some combination thereof since each defect detection parameter determination operation incurs some additional computation (and perhaps throughput) cost. In other words, the embodiments described herein can be implemented to determine only the defect detection parameter(s) that are of concern for an inspection process, which may include all of the defect detection parameter(s) described herein or fewer than all of them. In this manner, the embodiments described herein may be configured so that they are not performing unnecessary functions for some inspection processes. However, when it is known (or there is a concern) that an inspection process can be susceptible to image misalignment issues, issues related to the presence of large defects, and/or issues related to grossly defective image frames, whatever computation or other costs may result from using the embodiments described herein to address those issues will be more than offset by the improved inspection process performance enabled by the embodiments described herein.

The computer subsystem is also configured for detecting defects on the specimen by applying the defect detection method to the difference image frames with the determined one or more defect detection parameters. Detecting the defects on the specimen may otherwise be performed in any suitable manner known in the art, which may include applying a defect detection algorithm such as MDAT to the images with the defect detection parameter(s) selected as described herein.

The defects that are detected may include any defects on the specimen including large defects which tend to be missed by currently set Tmax values. For example, by automatically and dynamically setting the Tmax as described herein as opposed to guessing a Tmax setting as is currently done by users, the computer subsystem can robustly detect large defects on specimens such as those described herein. The embodiments can also detect such defects without requiring additional image processing of the difference images. For example, as an alternative to the embodiments described herein, the computer subsystem may be configured to apply a relatively large kernel size low pass filter to the difference image or down-sample the difference image so that the large defect becomes fewer pixels well-separated from the normal pixels. Such an approach would however be computationally expensive and require another threshold setting.

In one such embodiment, the computer subsystem is configured for determining one or more attributes of the detected defects based on results of the detecting. For example, one important advantage of the embodiments described herein is that they provide solutions to detect large defects robustly and allow accurate defect attribute calculation. The defect attributes of the large defects and any other defects detected by the computer subsystem may be determined in any suitable manner known in the art. The defect attributes may include any suitable defect attributes known in the art such as size, shape, orientation, etc.

The computer subsystem may generate inspection results, which may include the results of any of the steps described herein. The inspection results may include information for the detected defects such as defect IDs, location, etc., of the bounding boxes of the detected defects, sizes, detection scores, information about defect classifications such as class labels or IDs, etc., or any such suitable information known in the art. The results for the defects may be generated by the computer subsystem in any suitable manner. The results for the defects may have any suitable form or format such as a standard file type. The computer subsystem may generate the results and store the results such that the results can be used by the computer subsystem and/or another system or method to perform one or more functions for the specimen or another specimen of the same type.

The computer subsystem may be configured for storing the information for the detected defects in any suitable computer-readable storage medium. The information may be stored with any of the results described herein and may be stored in any manner known in the art. The storage medium may include any storage medium described herein or any other suitable storage medium known in the art. After the information has been stored, the information can be accessed in the storage medium and used by any of the method or system embodiments described herein, formatted for display to a user, used by another software module, method, or system, etc.

Results and information generated by performing the inspection on the specimen may be used in a variety of manners by the embodiments described herein and/or other systems and methods. Such functions include, but are not limited to, altering a process such as a fabrication process or step that was or will be performed on the inspected specimen or another specimen in a feedback or feedforward manner. For example, the computer subsystem may be configured to determine one or more changes to a process that was or will be performed on a specimen inspected as described herein based on the detected defect(s). The changes to the process may include any suitable changes to one or more parameters of the process. The computer subsystem preferably determines those changes such that the defects can be reduced or prevented on other specimens on which the revised process is performed, the defects can be corrected or eliminated on the specimen in another process performed on the specimen, the defects can be compensated for in another process performed on the specimen, etc. The computer subsystem may determine such changes in any suitable manner known in the art.

Those changes can then be sent to a semiconductor fabrication system (not shown) or a storage medium (not shown) accessible to the computer subsystem and the semiconductor fabrication system. The semiconductor fabrication system may or may not be part of the system embodiments described herein. For example, the computer subsystem and/or inspection subsystem described herein may be coupled to the semiconductor fabrication system, e.g., via one or more common elements such as a housing, a power supply, a specimen handling device or mechanism, etc. The semiconductor fabrication system may include any semiconductor fabrication system known in the art such as a lithography tool, an etch tool, a chemical-mechanical polishing (CMP) tool, a deposition tool, and the like.

Each of the embodiments of the system described above may be combined together into one single embodiment. In other words, unless otherwise noted herein, none of the system embodiments are mutually exclusive of any other system embodiments.

Another embodiment relates to a computer-implemented method for detecting defects on a specimen. The method includes generating one or more statistics for each of multiple tiles in difference image frames generated for a job of images for a specimen generated by an inspection subsystem. The method also includes identifying outlier tiles in the multiple tiles based on the one or more statistics generated for each of the multiple tiles. In addition, the method includes determining one or more defect detection parameters of a defect detection method for each of the difference image frames based on the identified outlier tiles. The method further includes detecting defects on the specimen by applying the defect detection method to the difference image frames with the determined one or more defect detection parameters. The generating, identifying, determining, and detecting steps are performed by a computer subsystem, which may be configured according to any of the embodiments described herein.

Each of the steps of the method may be performed as described further herein. The method may also include any other step(s) that can be performed by the inspection subsystem and/or computer subsystem described herein. In addition, the method described above may be performed by any of the system embodiments described herein.

Figure 19:
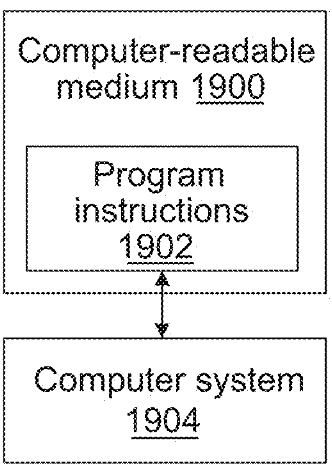
FIG. 19 is a block diagram illustrating one embodiment of a non-transitory computer-readable medium storing program instructions for causing a computer system to perform a computer-implemented method described herein.

An additional embodiment relates to a non-transitory computer-readable medium storing program instructions executable on a computer system for performing a computer-implemented method for detecting defects on a specimen. One such embodiment is shown in FIG. 19. In particular, as shown in FIG. 19, non-transitory computer-readable medium 1900 includes program instructions 1902 executable on computer system 1904. The computer-implemented method may include any step(s) of any method(s) described herein.

Program instructions 1902 implementing methods such as those described herein may be stored on computer-readable medium 1900. The computer-readable medium may be a storage medium such as a magnetic or optical disk, a magnetic tape, or any other suitable non-transitory computer-readable medium known in the art.

The program instructions may be implemented in any of various ways, including procedure-based techniques, component-based techniques, and/or object-oriented techniques, among others. For example, the program instructions may be implemented using ActiveX controls, C++ objects, JavaBeans, Microsoft Foundation Classes ("MFC"), SSE (Streaming SIMD Extension) or other technologies or methodologies, as desired.

Computer system 1904 may be configured according to any of the embodiments described herein.

Further modifications and alternative embodiments of various aspects of the invention will be apparent to those skilled in the art in view of this description. For example, methods and systems for detecting defects on a specimen are provided. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain attributes of the invention may be utilized independently, all as would be apparent to one skilled in the art after having the benefit of this description of the invention. Changes may be made in the elements described herein without departing from the spirit and scope of the invention as described in the following claims.

The invention claimed is:

1. A system configured for detecting defects on a specimen, comprising:

an inspection subsystem configured for generating images for a specimen; and a computer subsystem configured for:

generating one or more statistics for each of multiple tiles in difference image frames generated for a job of the images, wherein the one or more statistics comprise a mean for each of the multiple tiles;

identifying outlier tiles in the multiple tiles based on the one or more statistics generated for each of the multiple tiles, wherein identifying the outlier tiles comprises generating a histogram of the mean for each of the multiple tiles and identifying the outlier tiles based on the histogram of the mean;

designating the multiple tiles not identified as the outlier tiles based on the histogram of the mean as remaining tiles, wherein the one or more statistics further comprise range and standard deviation for each of the remaining tiles in a first of the difference image frames, and wherein identifying the outlier tiles further comprises generating range and standard deviation histograms for the remaining tiles in the first of the difference image frames and identifying outlier remaining tiles in the first of the difference image frames based on the range and standard deviation histograms as additional outlier tiles;

determining one or more defect detection parameters of a defect detection method for each of the difference image frames based on the identified outlier tiles; and detecting defects on the specimen by applying the defect detection method to the difference image frames with the determined one or more defect detection parameters.

2. The system of claim 1, wherein the difference image frames comprise difference image frames generated for only one threshold region in the images.

3. The system of claim 1, wherein the computer subsystem is further configured for designating a second of the difference image frames as a grossly defective image frame when a number of the outlier tiles in the second of the difference image frames is above a predetermined number.

4. The system of claim 1, wherein when one or more of the remaining tiles are identified as the additional outlier tiles, the computer subsystem is further configured for designating the outlier tiles and the additional outlier tiles in the first of the difference image frames as misaligned tiles and generating new difference image frames for the job by aligning test and reference image frames for the job with a second search range larger than a first search range used for aligning the test and reference images for generating the difference image frames.

5. The system of claim 1, wherein when one or more of the remaining tiles are identified as the additional outlier tiles, the computer subsystem is further configured for generating an output to a user indicating that an image misalignment has occurred in generating the difference image frames.

6. The system of claim 1, wherein when none of the remaining tiles are identified as the additional outlier tiles, the computer subsystem is further configured for designating the outlier tiles identified based on the histogram of the mean as large defect tiles.

7. The system of claim 6, wherein the computer subsystem is further configured for designating the first of the difference image frames as a grossly defective image frame when a number of the large defect tiles in the first of the difference image frames is above a predetermined threshold.

8. The system of claim 1, wherein the one or more statistics further comprise a standard deviation for each of the multiple tiles, and wherein identifying the outlier tiles further comprises generating an additional histogram of the mean of the standard deviation for each of the multiple tiles and identifying the outlier tiles based on the histogram and the additional histogram.

9. The system of claim 8, wherein the computer subsystem is further configured for designating a second of the difference image frames as a grossly defective image frame when a number of the outlier tiles in the second of the difference image frames is above a predetermined threshold.

10. The system of claim 1, wherein when one of the difference image frames is determined to be a grossly defective image frame based on the one or more statistics, determining the one or more defect detection parameters for the one of the difference image frames comprises determining a threshold max based on at least one of the one or more statistics generated for non-outlier tiles in the job.

11. The system of claim 10, wherein the at least one of the one or more statistics comprises peak noise of all of the non-outlier tiles in the job and standard deviation of a noisiest of the non-outlier tiles in the job.

12. The system of claim 1, wherein when one of the difference image frames is not determined to be a grossly defective image frame based on the one or more statistics, determining the one or more defect detection parameters for the one of the difference image frames comprises determining a threshold max based on at least one of the one or more statistics generated for non-outlier tiles in the one of the difference image frames.

13. The system of claim 12, wherein the at least one of the one or more statistics comprises peak noise of all of the non-outlier tiles in the one of the difference image frames and standard deviation of a noisiest of the non-outlier tiles in the one of the difference image frames.

14. The system of claim 1, wherein determining the one or more defect detection parameters comprises determining a threshold max based on the one or more statistics to thereby detect defects on the specimen having a characteristic sufficient to affect the one or more statistics in any one of the difference image frames.

15. The system of claim 14, wherein the computer subsystem is further configured for determining one or more attributes of the detected defects based on results of the detecting.

16. The system of claim 1, wherein each of the multiple tiles has a size of between 64 pixels by 64 pixels to 256 pixels by 256 pixels.

17. A non-transitory computer-readable medium, storing program instructions executable on a computer system for performing a computer-implemented method for detecting defects on a specimen, wherein the computer-implemented method comprises:

generating one or more statistics for each of multiple tiles in difference image frames generated for a job of images for a specimen generated by an inspection subsystem, wherein the one or more statistics comprise a mean for each of the multiple tiles;

identifying outlier tiles in the multiple tiles based on the one or more statistics generated for each of the multiple tiles, wherein identifying the outlier tiles comprises generating a histogram of the mean for each of the multiple tiles and identifying the outlier tiles based on the histogram of the mean;

designating the multiple tiles not identified as the outlier tiles based on the histogram of the mean as remaining tiles, wherein the one or more statistics further comprise range and standard deviation for each of the remaining tiles in a first of the difference image frames, and wherein identifying the outlier tiles further comprises generating range and standard deviation histograms for the remaining tiles in the first of the difference image frames and identifying outlier remaining tiles in the first of the difference image frames based on the range and standard deviation histograms as additional outlier tiles;

determining one or more defect detection parameters of a defect detection method for each of the difference image frames based on the identified outlier tiles; and detecting defects on the specimen by applying the defect detection method to the difference image frames with the determined one or more defect detection parameters.

18. A computer-implemented method for detecting defects on a specimen, comprising:

generating one or more statistics for each of multiple tiles in difference image frames generated for a job of images for a specimen generated by an inspection subsystem, wherein the one or more statistics comprise a mean for each of the multiple tiles;

identifying outlier tiles in the multiple tiles based on the one or more statistics generated for each of the multiple tiles, wherein identifying the outlier tiles comprises generating a histogram of the mean for each of the multiple tiles and identifying the outlier tiles based on the histogram of the mean;

designating the multiple tiles not identified as the outlier tiles based on the histogram of the mean as remaining tiles, wherein the one or more statistics further comprise range and standard deviation for each of the remaining tiles in a first of the difference image frames, and wherein identifying the outlier tiles further comprises generating range and standard deviation histograms for the remaining tiles in the first of the difference image frames and identifying outlier remaining tiles in the first of the difference image frames based on the range and standard deviation histograms as additional outlier tiles;

determining one or more defect detection parameters of a defect detection method for each of the difference image frames based on the identified outlier tiles; and detecting defects on the specimen by applying the defect detection method to the difference image frames with the determined one or more defect detection parameters, wherein said generating, identifying, designating, determining, and detecting are performed by a computer subsystem.

* * * * *